Patented May 27, 1952

2,598,229

UNITED STATES PATENT OFFICE 2,598,229

PROCESS OF MAKING AGGLOMERATES FOR RUBBER COMPOUNDING AND PRODUCT THEREOF

Kenneth E. Creed, Jr., Nitro, W. Va., assignor to Monsanto Chemical Company, St. Louis, Mo., a corporation of Delaware No Drawing. Application September 8, 1950,
Serial No. 183,897

8 Claims. (Cl. 260—306)

This invention relates to improved dust-free compositions and methods of making same. More particularly it relates to a method of producing free-flowing dustless bead-like agglomerates for rubber compounding.

In order to reduce the dustiness of rubber compounding agents as for example accelerators of vulcanization it has been proposed to treat them with additives such as mineral oils, vegetable oils, salts of fatty acids, and similar materials or to compress them into pills and other forms. However, none of these compositions are entirely satisfactory. Either they possess varying amounts of finely divided particles such that when the compositions are shaken or poured from a container some of the fines float in the air as dust or they are so dense and hard that they fail to disintegrate and disperse on admixing into the rubber.

In co-pending application of Monte C. Throdahl, Serial No. 106,328 of July 22, 1949, now abandoned, is described a process of producing non-dusting accelerator compositions by forming particulate aggregates without pressure. Such aggregates are produced by stirring and heating an aqueous slurry of the accelerator to be agglomerated with a waxy material and cooling below the melting point of the waxy material the latter constituting 33–55 parts per 100 of the accelerator. The present invention relates to improvements in this process with respect to converting 2,2-dithiobis benzothiazole into particulate aggregates.

In accordance with the present invention it has been found that the characteristics of the particles depend to a large extent on the temperature at which they are formed. At relatively high temperatures, preferably above about 85° C., hard agglomerates are produced which have unusually desirable storage and packaging characteristics and freedom from dust but which nevertheless are friable and disperse satisfactorily into rubber. Such agglomerates are produced by heating an aqueous slurry of 2,2'-dithiobis benzothiazole above about 85° C. in the presence of a waxy material while stirring and continuing the heating unit bead-like agglomerates are formed. Another important advantage of a high temperature is that with low proportions of the waxy material bead-like particles form much more rapidly. While it is possible to influence the size and yield of the agglomerates by manipulation of the cooling, it has now been found much more satisfactory to control the process by continuing the heating until particles of the desired size are formed and quenching the reaction suddenly.

Soaps and surface agents in general are undesirable since they interfere with the preparation of bead-like particles. Furthermore, the desired adsorption of stearic acid takes place more readily in acid or neutral medium. Accordingly, the pH of the slurry should be adjusted to 7 or below.

2,2'-dithiobis benzothiazole is usually made commercially by oxidation in aqueous solution of sodium mercaptobenzothiazole. It is unnecessary to isolate the product from the reaction mixture prior to converting it to a particulate aggregate. A waxy material, preferably stearic acid, is strongly adsorbed on the surface of the accelerator to the exclusion of inorganic salts and other by-products and unreacted ingredients which may be present. As a matter of fact, when aggregates are formed in the presence of not more than 10% stearic acid on the 2,2'-dithiobis benzothiazole, the by-product materials normally present in the slurry noticeably aid the formation of bead-like particles and reduce the time required for them to form. The presence of by-product salt, unreacted mercaptobenzothiazole and sulfur are all beneficial. Additionally, the presence of thiosulfate has been established and its presence found beneficial. It is therefore advantageous if the disulfide is isolated and redispersed to add small amounts of one or more such ingredients.

The following example illustrates the preparation of bead-like particles from low proportions of stearic acid employing an original slurry.

2,2'-dithiobis benzothiazole was prepared by oxidizing mercaptobenzothiazole by the method of U. S. Patent 2,265,347 to Carr. While vigorously agitating, chlorine gas was introduced into the space above a solution of approximately 9% sodium mercaptobenzothiazole. As the chlorine was absorbed the disulfide rapidly precipitated as fine particles. Upon completion of the reaction the slurry was neutralized by means of hydrochloric acid to a pH of 5 or below. (Adjusting the pH to 5 or below before adding stearic acid hastens the formation of agglomerates.) Stearic acid was then added in such amounts as to constitute approximately 5% of the combined weight of accelerator and stearic acid. The mixture was heated at 80–100° C. while subjected to efficient agitation; the stirring and heating being continued until bead-like agglomerates were produced. In general, from three to six hours heating produced hard bead-like agglomerates in substantially quantitative yield; all of which were retained on a 40 mesh screen. The reaction was terminated by cooling for example, by quenching with an excess of water; then the solids were filtered off, washed, and dried.

Hard bead-like particles prepared by continued heating and stirring in the presence of not more than 10% stearic acid on the accelerator content can be readily dispersed into rubber by the use of ordinary mixing equipment and at the temperatures commonly employed. Thus, the particles which are stable and hard as produced readily disintegrate on mixing into a rubber stock. The vulcanization rate and physical properties of the vulcanizates were undistinguishable from those containing the benzothiazyl disulfide in the usual fine powder form. Particles of a size between 60 and 80 mesh are particularly desirable. The process can be controlled to give particles having to the naked eye the appearance of uniform size and shape. However, they are actually somewhat irregular and variable in shape and further characterized by a range of sizes. They may be essentially spherical and generally give this impression. However close examination often reveals a popcorn appearance, probably the result of the combination of several particles.

Substantially 96.1 parts by weight of finely divided 2,2'-dithiobis benzothiazole was dispersed in an aqueous solution containing 50 parts by weight of sodium chloride together with 5.6 parts by weight of stearic acid and 11.3 parts by weight of mercaptobenzothiazole. The mixture was stirred and heated at about 95° C. for five hours, then cooled by the addition of cold water, and the solids filtered off, washed, and dried. The product consisted of particulate bead-like agglomerates substantially all of which were retained on a 40 mesh screen. The presence of at least five parts mercaptobenzothiazole and 1.5 parts of sulfur on the disulfide materially shortens the time required to form agglomerates in a salt free slurry.

Substantially 80 parts by weight of finely divided 2,2'-dithiobis benzothiazole and 4.5 parts by weight of stearic acid were slurried in 600 parts by weight of water and sufficient hydrochloric acid added to lower the pH to about 4. 3.8 parts by weight of sodium thiosulfate were added and the mixture heated and stirred at about 98° C. for two hours and the small bead-like agglomerates filtered off and dried. 72.5 parts by weight of material retained on a 60 mesh screen were obtained.

A similar slurry was prepared containing in addition 3.2 parts by weight of sulfur and the mixture heated at about 98° C. as before and stirred until bead-like agglomerates formed. Small grains of agglomerates were visible after heating about an hour. After four hours substantially a quantitative yield of bead-like agglomerates averaging approximately $\frac{1}{16}$" in diameter were obtained. Smaller size agglomerates are obtained by shorter heating periods.

Although the invention has been described and illustrated in connection with certain embodiments of the invention, it is to be understood that modifications and variations thereof may be made without departing from the spirit or scope. Other waxy materials may be substituted for stearic acid as for example, paraffin, oleic acid, lauric acid, myristic acid, palmitic acid, diethylene glycol monostearate. While pressures above atmospheric are unnecessary, they may be employed if desired. Temperatures above 85° C. up to the temperature of reflux at atmospheric pressure are convenient, but the process may be carried out by heating up to the temperature at which the 2,2'-dithiobis benzothiazole becomes liquid.

What is claimed is:

1. The process of making an improved dustless free-flowing 2,2'-dithiobis benzothiazole composition for rubber compounding which comprises producing an aqueous dispersion of 2,2'-dithiobis benzothiazole by oxidizing sodium mercaptobenzothiazole in aqueous solution, adjusting the pH of the dispersion at least as low as 7, and without isolating the product adding a higher fatty acid in such amount as to constitute about 5%–9% of the combined weight of fatty acid and 2,2'-dithiobis benzothiazole, stirring and heating the dispersed mixture in the presence of the by-product salts accompanying the formation of 2,2'-dithiobis benzothiazole at a temperature in the range of 85° C. to refluxing temperature until bead-like agglomerates larger than 80 mesh are formed.

2. The process of making an improved dustless free-flowing 2,2'-dithiobis benzothiazole composition for rubber compounding which comprises producing an aqueous dispersion of 2,2'-dithiobis benzothiazole by oxidizing with chlorine sodium mercaptobenzothiazole in aqueous solution, adjusting the pH of the dispersion at least as low as 7, and without isolating the product adding a higher fatty acid in such amount as to constitute about 5%–9% of the combined weight of fatty acid and 2,2'-dithiobis benzothiazole, stirring and heating the dispersed mixture in the presence of the by-product salts accompanying the formation of 2,2'-dithiobis benzothiazole at a temperature in the range of 85° C. to refluxing temperature until bead-like agglomerates larger than 80 mesh are formed.

3. The process of making an improved dustless free-flowing 2,2'-dithiobis benzothiazole composition for rubber compounding which comprises producing an aqueous dispersion of 2,2'-dithiobis benzothiazole by oxidizing with chlorine sodium mercaptobenzothiazole in aqueous solution, adjusting the pH of the dispersion at least as low as 7, and without isolating the product adding stearic acid in such amount as to constitute about 5%–9% of the combined weight of stearic acid and 2,2'-dithiobis benzothiazole, stirring and heating the dispersed mixture in the presence of the by-product salts accompanying the formation of 2,2'-dithiobis benzothiazole at 90–100° C. until bead-like agglomerates larger than 80 mesh are formed.

4. The process of making an improved dustless free-flowing 2,2'-dithiobis benzothiazole composition for rubber compounding which comprises producing an aqueous dispersion of 2,2'-dithiobis benzothiazole by oxidizing sodium mercaptobenzothiazole in aqueous solution, adjusting the pH of the dispersion at least as low as 5 and without isolating the product adding stearic acid in such amount as to constitute about 5%–9% of the combined weight of stearic acid and 2,2'-dithiobis benzothiazole, stirring and heating the dispersed mixture in the presence of the by-product salts accompanying the formation of 2,2'-dithiobis benzothiazole at about 85° C. to refluxing temperature until bead-like agglomerates larger than 80 mesh are formed.

5. The process of making an improved dustless free-flowing 2,2'-dithiobis benzothiazole composition for rubber compounding which comprises stirring and heating within the range of about 85° C. to refluxing temperature at a pH not above an aqueous suspension of 2,2'-dithiobis benzothiazole and a higher fatty acid, the latter constituting about 5–9% of the mixture in the presence of a salt selected from the group consisting of sodium chloride and sodium thiosulfate.

6. An improved dustless free-flowing 2,2'-dithiobis benzothiazole composition for rubber compounding consisting essentially of hard bead-like agglomerates larger than 80 mesh in size composed of about 5%–9% of a waxy binder and about 95%–91% of accelerator component consisting essentially in a major proportion of 2,2'-dithiobis benzothiazole and a minor proportion of mercapto-benzothiazole, the agglomerates being irregular and variable in size and shape and characterized by disintegrating and dispersing on milling into rubber.

7. An improved dustless free-flowing 2,2'-dithiobis benzothiazole composition for rubber compounding consisting essentially of hard bead-like agglomerates larger than 80 mesh in size but averaging no more than about $\frac{1}{16}$" in diameter composed of about 5%–9% of a higher fatty acid and about 95%–91% of accelerator component consisting essentially in a major proportion of 2,2'-dithiobis benzothiazole and a minor proportion of mercapto-benzothiazole, the agglomerates being irregular and variable in size and shape and characterized by disintegrating and dispersing on milling into rubber.

8. An improved dustless free-flowing 2,2-dithiobis benzothiazole composition for rubber compounding consisting essentially of hard bead-like agglomerates larger than 80 mesh in size but averaging no more than about $\frac{1}{16}$" in diameter composed of about 5%–9% of stearic acid and about 95%–91% of accelerator component consisting essentially in a major proportion of 2,2'-dithiobis benzothiazole and a minor proportion of mercapto-benzothiazole, the agglomerates being irregular and variable in size and shape and characterized by disintegrating and dispersing on milling into rubber.

KENNETH E. CREED, Jr.

REFERENCES CITED

The following references are of record in the file of this patent:

UNITED STATES PATENTS

| Number | Name | Date |
|---|---|---|
| 2,326,984 | Tomlin | Aug. 17, 1943 |
| 2,343,835 | Smith | Mar. 7, 1944 |